United States Patent Office 3,557,285
Patented Jan. 19, 1971

3,557,285
METHODS FOR PROVIDING MUSCLE RELAXATION WITH 1-(SUBSTITUTED) - 5- AMINO-TETRAZOLES
Takashi Enkoji, Park Forest, and Charles D. Bossinger, Olympia Fields, Ill., assignors to Armour Pharmaceutical Company, Chicago, Ill., a corporation of Delaware
No Drawing. Original application Oct. 10, 1966, Ser. No. 585,251. Divided and this application Mar. 6, 1969, Ser. No. 804,991
The portion of the term of the patent subsequent to Oct. 11, 1983, has been disclaimed
Int. Cl. A61k 27/00
U.S. Cl. 424—269                 8 Claims

ABSTRACT OF THE DISCLOSURE

Methods and preparations to provide muscle relaxation for a host animal in need of such therapy using a biologically active 1-substituted-5-aminotetrazole.

---

This application is a divisional of application Ser. No. 585,251, filed Oct. 10, 1966.

This invention relates to therapeutic treatment of the animal organism with 1 - substituted - 5 - aminotetrazoles. More particularly, the invention relates to treatment methods and compositions, and to novel pharmacologically active 1-substituted-5-aminotetrazoles employed in the methods and compositions.

An area of treatment for which the present methods and preparations are well suited involves the central nervous system, especially in the provision of muscle relaxation, more particularly, long-lasting relaxation of the skeletal muscles.

We have discovered in accordance with this invention that 1-substituted-5-aminotetrazoles, and particularly that certain 1-substituted phenyl-5-aminotetrazoles such as 1 - halophenyl - 5-aminotetrazoles, 1-alkylphenyl-5-aminotetrazoles, 1-alkoxyphenyl-5-aminotetrazoles and 1-hydroxyphenyl-5-aminotetrazoles; and certain 1-substituted benzyl-5-aminotetrazoles, such as 1-halobenzyl-5-aminotetrazoles and 1 - alkylphenyl - 5-aminotetrazoles, and 1-phenethyl-5-aminotetrazoles possess advantageous pharmacological properties. In particular, these compounds possess central nervous system depressant, especially muscle relaxant activities.

This invention also provides new pharmaceutical compositions employing said 1-substituted-5-aminotetrazoles or a pharmaceutically acceptable salt thereof as an active agent and new methods of treating the animal organism therewith, especially to produce muscle relaxation.

This invention also provides novel 1-substituted-5-aminotetrazoles wherein the substituting moiety is monobromophenyl, monofluorophenyl, dichlorophenyl, monochlorobenzyl and monomethylbenzyl.

The 1-monochlorophenyl-5-aminotetrazoles were known prior to the present invention (Henry et al., J. Am. Chem. Soc., 76, 88–93, 1954). However, so far as we are aware, these compounds were not known to possess central nervous system depressant activities nor to have utility in the treatment of an afflicted host animal organism as discovered by us. The 1-monobromophenyl-, 1-monofluorophenyl-, and 1-dichlorophenyl-5-aminotetrazoles as well as the 1-monochlorobenzyl-5-aminotetrazoles and 1-methylbenzyl-5-aminotetrazole provided by the invention are new compounds, so far as we are aware, having central nervous system depressant activities.

To aid in the understanding of the invention, we shall now describe the preparation of a 1-substituted-5-aminotetrazole, for illustrative purposes shall refer to 1-halophenyl-5-aminotetrazole to typify the compounds.

The 1-halophenyl-5-aminotetrazoles can be prepared by reacting halophenylthiourea with an alkyl halide to produce halophenyl-S-alkyl-isothiourea hydrohalide, the reaction being represented as follows:

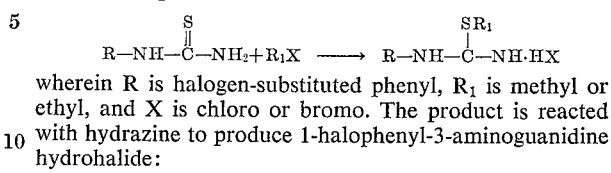

wherein R is halogen-substituted phenyl, $R_1$ is methyl or ethyl, and X is chloro or bromo. The product is reacted with hydrazine to produce 1-halophenyl-3-aminoguanidine hydrohalide:

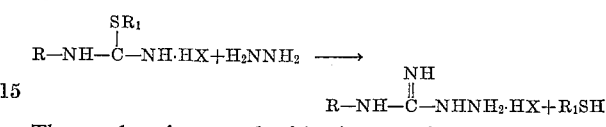

The product is reacted with nitrous acid to produce the 1-halophenyl-5-aminotetrazole:

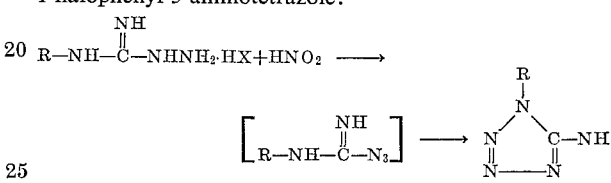

In the preferred embodiments of the invention, R is monochlorophenyl, monobromophenyl, monofluorophenyl, dichlorophenyl, monomethylphenyl, monomethoxyphenyl, dimethylphenyl, monochlorobenzyl or monomethylbenzyl.

The 1-substituted-5-aminotetrazoles may be employed as the free bases or in the form of their non-toxic pharmaceutically acceptable salts. Thus, for example, organic and inorganic acid addition salts may be employed, such as the salts of sulfuric, nitric, phosphoric, citric, acetic, lactic, tartaric, sulfamic, succinic, fumaric, maleic, ethanedisulfonic, hydrobromic, benzoic and similar non-toxic acids. The salts may be prepared by reacting the tetrazole bases with excess acid in a suitable solvent, such as ethanol, acetone, water, or mixtures thereof. The mixture is heated to effect solution, and the salts crystallize on cooling.

The 1-substituted-5-aminotetrazoles and their salts are administered in therapeutically effective amounts to animals, including man, and in appropriate ways. Thus, daily dosages of about 50 milligrams to 8000 milligrams, preferably about 300 milligrams to 4000 milligrams may be provided in systemic administration to man, e.g., orally or parenterally. The compound may be administered systemically to animals other than man in daily dosages up to about 400 milligrams per kilogram of body weight. The foregoing and other dosage levels herein are based on the content of tetrazole base. The compounds have long-lasting effects, lasting as long as 24 hours or more, a low order of toxicity, and relatively few observed side effects.

In the preferred embodiments of the invention, a 1-substituted-5-aminotetrazole or a salt thereof is administered in a pharmaceutical composition which includes the tetrazole compound and a pharmaceutical carrier. The carrier is a non-toxic pharmaceutical grade substance, which may be either solid or liquid. Suitable solid carriers include lactose, magnesium stearate, starch, sucrose, mannitol, sorbitol, cellulose powder, dicalcium phosphate, talc, stearic acid, gelatin, agar pectin, acacia and the like. Suitable liquid carriers include glycols, polyglycols, peanut oil, olive oil, sesame oil, alcohols, water, and the like. If desired, the carrier may include a time delay material such as glycerol monostearate, or glycerol di-stearate, alone or with a wax.

The composition preferably is provided in unit dosage form for accuracy and convenience in administration. Where appropriate, oral administration is effective and preferred, and dosage units suiatble for oral administration are provided. Examples of such dosage units employing solid carriers include tablets, filled capsules, packets and the like, and lozenges. The amount of solid carrier per dosage unit may vary widely, preferably from about 25 milligrams to 1 gram.

The tetrazoles and their salts may be compounded with semi-solid and liquid carriers in solutions, suspensions, emulsions, ointments, suppositories and soft gelatin capsules, for example. Such compositions may be administered pancavally, i.e., via natural and artificial openings in the body, such as the mouth, the anus, the vagina, the nares, and the stoma of colostomy patients, intravenously or intramuscularly, employing the appropriate composition having a suitable concentration of active ingredient according to the desired route of administration.

The foregoing dosage forms are prepared by conventional procedures of mixing, granulating, compressing, suspending and/or dissolving, as is suitable to prepare the desired dosage form.

The muscle relaxation of a host animal including man which has a condition which requires such treatment is readily obtained by administering to the affected host a 1-substituted-5-aminotetrazole or a pharmaceutically acceptable acid addition salt thereof in an amount sufficient to alleviate the symptoms of the condition. The usual symptoms requiring treatment are abnormal muscle tone and tension.

The compound preferably is administered at the dosage level described above and preferably in a pharmaceutical carrier. The dosage level and frequency of administration are to a certain extent subjective, attention being given to the degree of relaxation needed, the case history, the reaction of the subject, and the like.

The daily dosage can be administered in one or more parts and the administration can be accomplished pancavally or parenterally so long as it is internal. Administration preferably is oral and is most conveniently accomplished by means of a tablet containing one of the active compounds and a pharmaceutical carrier.

We have obtained especially good results when administering to the animal organism the following 1-substituted-5-aminotetrazoles to obtain muscle relaxation therein. The tetrazoles so used are:

1-(m-methylphenyl)-5-aminotetrazole,
1-(p-methylphenyl)-5-aminotetrazole,
1-(2,6-dimethylphenyl)-5-aminotetrazole,
1-(o-methylphenyl)-5-aminotetrazole,
1-(2,6-dichlorophenyl)-5-aminotetrazole,
1-(o-monochlorophenyl)-5-aminotetrazole,
1-(m-monochlorophenyl)-5-aminotetrazole,
1-(p-monochlorophenyl)-5-aminotetrazole,
1-(o-bromophenyl)-5-aminotetrazole,
1-(m-bromophenyl)-5-aminotetrazole,
1-(p-bromophenyl)-5-aminotetrazole,
1-(o-fluorophenyl)-5-aminotetrazole,
1-(m-fluorophenyl)-5-aminotetrazole,
1-(p-fluorophenyl)-5-aminotetrazole,
1-(o-methoxyphenyl)-5-aminotetrazole,
1-benzyl-5-aminotetrazole,
1-(o-monochlorobenzyl)-5-aminotetrazole,
1-(m-monochlorobenzyl)-5-aminotetrazole,
1-(p-monochlorobenzyl)-5-aminotetrazole,
1-phenethyl-5-aminotetrazole.

The onset of activity in the animal organism is rapid, results being observed within one-half hour, and the activity is sustained. Thus, the activity levels remain high for two or more hours, and activity persists over a 24-hour period. The long-lasting activity is of particular significance, inasmuch as prior muscle relaxants lacked the desired duration of activity.

Of the 1-substituted-5-aminotetrazoles which may be employed to produce muscle relaxation, those having ortho substitution appear to provide most desirable results. Thus, the 1-(ortho-monohalophenyl)-5-aminotetrazoles, 1-(2,6-dichlorophenyl)-5 - aminotetrazole, ortho-monomethyl-5-aminotetrazole and 1-(2,6-dimethylphenyl)-5-aminotetrazole are preferred.

The following examples are illustrative of the preparation of the 1-substituted-5-aminotetrazoles employed in the invention, especially the novel compounds of the invention, of the new pharmaceutical compositions, and of the treatment of the animal organism in accordance with the invention and the activities exhibited in such treatment. It is to be understood that the invention is not limited to the examples or to the compounds, compositions, proportions, conditions, and methods set forth therein, which are only illustrative. Throughout the examples, the 1-halophenyl-5-aminotetrazoles have been used to typify the compounds and compositions of the invention.

EXAMPLE 1

The preparation of a 1-dichlorophenyl-5-aminotetrazole is illustrated by the preparation of 1-(2,4-dichlorophenyl)-5-aminotetrazole, as follows:

To a solution of 11.8 g. (0.053 mile) of 2,4-dichlorophenyl thiourea in 50 ml. of anhydrous ethanol was added 7.5 g. (0.053 mole) of methyl iodide. The solution was stirred for 30 minutes at room temperature and then refluxed for an additional 30 minutes. The solvent was removed by distillation under reduced pressure. The solid residue was washed with 100 ml. of anhydrous ether and dried to yield 16.8 g. (86% of theory) of 1-(2,4-dichlorophenyl)-S-methylisothiourea hydriodide, M.P. 169–70°. This material was used in the next step without further purification.

To a suspension of 16.8 g. (0.046 mole) of crude 1-(2,4-dichlorophenyl)-S-methylisothiourea hydriodide in 40 ml. of anhydrous ethanol was added 1.7 g. (0.05 mole) of anhydrous 95% hydrizine. The mixture was heated gently until the initial vigorous evolution of methyl mercaptan had subsided. The solution was refluxed for an additional hour and the solvent was removed by distillation under vacuum. The oil which remained solidified upon standing, and the solid cake was broken up, washed with anhydrous ether and dried to yield 12.9 g. (81% of theory) of 1-(2,4-dichlorophenyl)-3-aminoguanidine hydriodide, M.P. 134–7° C. This material was used in the next step without further purification.

To a solution of 12.9 g. (0.038 mole) of 1-(2,4-dichlorophenyl)-3-aminoguanidine hydriodide in 85 ml. of warm water was added a mixture of 0.6 ml. of concentrated nitric acid, 20 ml. of water and 6.70 g. (0.11 mole) of silver nitrite. After mixing for 5 minutes, 2 ml. of concentrated hydrochloric acid was added, and the precipitated silver halides were removed by filtration and washed with a few ml. of water. The filtrates and wash water were combined and diluted to 170 ml., and an additional 2 ml. of concentrated hydrochloric acid was added. The mixture was cooled with stirring to 10° C. in a nice bath, and a cold solution of 2.86 g. (0.041 mole) of sodium nitrate in 20 ml. of water was added dropwise at a rate to maintain the temperature at 10–15° C. When addition was completed, stirring and cooling were continued for 30 minutes and the pH of the reaction mixture was adjusted to 8–9 by the careful addition of solid sodium carbonate. The mixture was heated to 50° C. and recooled to 10° C. The precipitate was collected by filtration, washed with cold water and dried. solid was recrystillized from 170 ml. of ethanol to yield 6.12 g. (72% of theory) of 1-(2,4-dichlorophenyl)-5-aminoeterazole, M.P. 243–4° C. dec. A sample for analysis was recrystallized several times from isopropanol, M.P. 244–6° C. dec.

| Derivatives: | Melting point, ° C. with dec. |
|---|---|
| 2,3-dichlorophenyl | 247–8 |
| 2,5-dichlorophenyl hydrate (2½H$_2$O) | 181–2 |
| 2,5-dichlorophenyl (anhydrous) | 262 |
| 2,6-dichlorophenyl | 244–5 |
| 3,4-dichlorophenyl | 204–5 |
| 3,5-dichlorophenyl | 254–5 |

EXAMPLE 2

The preparation of 1-monohalophenyl-5-aminotetrazoles is illustrated by the preparation of 1-(p-bromophenyl)-5-aminotetazole, as follows:

By the method described in the Example 1, p-bromophenyl-S-methylisothiourea hydriodide was prepared from 50.2 g. (0.22 mole) of p-bromophenyl thiourea, 31.2 g. (0.22 mole) of methyl iodide and 400 ml. of anhydrous ethanol. The yield was 79.4 g. (97% of theory), M.P. 200–1° C. dec.

A mixture of 37.3 g. (0.1 mole) of p-bromophenyl-S-methylisothiourea hydriodide, 3.71 g. (0.11 mole) of 95% anhydrous hydrazine and 200 ml. of anhydrous ethanol was refluxed for 1½ hours and worked up as in Example 1 to yield 30.6 g. (85% of theory) of 1-(p-bromophenyl)-3-aminoguanidine hydriodide as a semisolid.

All of this material was converted to the corresponding tetrazole compound as in Example 1. Concentrated ammonium hydroxide was used instead of sodium carbonate to adjust the pH of the final reaction mixture to 8. The yield of crude product was 14.6 g., M.P. 187–9° C. dec. This material was recrystallized twice from 6 N hydrochloric acid and dried at 100° C. under vacuum to yield 5.76 g. (28% of theory) of pure 1-(p-bromophenyl)-5-aminotetrazole, M.P. 242–3° C. dec.

The following new monohalophenyl derivatives are prepared in like manner, and they have the indicated melting points.

| Derivatives: | Melting point, ° C. with dec. |
| --- | --- |
| Ortho-bromophenyl | 224–5 |
| Meta-bromophenyl | 185–6 |
| Ortho-fluorophenyl | 174–5 |
| Meta-fluorophenyl | 170–1 |
| Para-fluorophenyl | 195–6 |

EXAMPLE 3

The following are examples of several types of pharmaceutical compositions according to the invention:

Composition A

Tablets suitable for oral administration and having the following composition per tablet are produced by compounding the ingredients in the same relative proportions.

| Ingredients: | Amount, mg. |
| --- | --- |
| 1-substituted-5-aminotetrazole | 200 |
| Sorbitol | 15 |
| Mannitol | 85 |
| Gelatin, as a 10% aqueous solution | 6 |
| Corn starch | 30 |
| Magnesium stearate | 4 |

The first three ingredients are milled together to a uniform powder and granulated into the gelatin solution. The mixture is screened onto trays and dried at 60° C. The dried granules are sized, mixed with the corn starch and the magnesium stearate, and compressed into tablets.

Composition B

Tablets suitable for oral administration and having the following composition per tablet are produced by compounding the ingredients in the same relative proportions.

| Ingredients: | Amount, mg. |
| --- | --- |
| 1-substituted-5-aminotetrazole | 200 |
| Microcrystalline cellulose [1] | 150 |
| Polyvinyl pyrrolidone | 5 |
| Magnesium stearate | 4 |

[1] Avicel (FMC Corporation, U.S. Pat. No. 2,978,446), average particle size 38 microns.

The first three ingredients are mixed to uniformity and lubricated with a portion of the magnesium stearate. The mixture is compressed into slugs, and the slugs are reduced to uniformity and granulated. The granules are lubricated with the remainder of the magnesium stearate and compressed into tablets.

Composition C

Filled gelatin capsules suitable for oral administration and containing the following composition in each capsule are produced by compounding the ingredients in the same relative proportions.

| Ingredients: | Amount, mg. |
| --- | --- |
| 1-substituted-5-aminotetrazole | 200 |
| Lactose | 175 |
| Magnesium stearate | 5 |

The above ingredients are screened through a #40 U.S. mesh screen to a uniform powder, transferred to a mixer, mixed well, and filled into #1 hard gelatin capulses.

Composition D

Filled soft gelatin capsules suitable for oral administration and containing the following compositions in each capsule are produced by compounding the ingredients in the same relative proportions.

| Ingredients: | Amount, mg. |
| --- | --- |
| 1-substituted-5-aminotetrazole | 50 |
| Sesame oil | 50 |

The ingredients are mixed to form a thick slurry, and the slurry is filled into soft gelatin capsules.

Composition E

Filled soft gelatin capsules suitable for oral administration and containing the following compositions in each capsule are produced by compounding the ingredients in the same relative proportions.

| Ingredients: | Amount, mg. |
| --- | --- |
| 1-substituted-5-aminotetrazole | 300 |
| Polyethylene glycol 400 | 240 |

The ingredients are mixed to form a thick slurry, and the slurry is filled into soft gelatin capsules.

Composition F

The following ingredients are compounded to provide a solution suitable for intramuscular administration.

| Ingredients: | Amount, mg. |
| --- | --- |
| 1-substituted-5-aminotetrazole | 200 |
| Polyethylene glycol 200, q.s. up to 1 liter. | |

The ingredients are mixed and warmed to about 50–60° C. with stirring to effect solution. The solution is sterile filtered, cooled to room temperature, and packaged in sterile vials.

Composition G

Suppositories melting at about 60° F. and each having the following compositions are produced by compounding the ingredients in the same relative proportions.

| Ingredients: | Amount, mg. |
| --- | --- |
| 1-substituted-5-aminotetrazole | 200 |
| Polyethylene glycol 600 | 200 |
| Polyethylene glycol 4000 | 800 |

The ingredients are mixed and heated to about 60° C. to effect solution. The solution is poured into cooled molds and allowed to cooled and thereby solidify.

Composition H

Tablets used for oral administration of 1-(2,4-dichlorophenyl)-5-aminotetrazole as described hereinafter and having the following composition per tablet are produced by compounding the ingredients in the same relative proportions.

Ingredients: Amount, mg.
1-(2,4-dichlorophenyl)-5-aminotetrazole _____ 200
Dicalcium phosphate _____ 180
Corn starch _____ 60
Polyvinylpyrrolidone _____ 5
Magnesium stearate _____ 4

The tetrazole, dicalcium phosphate and a portion of the starch and magnesium stearate are mixed, granulated with an alcoholic solution of the polyvinylpyrrolidone, dried, and sized. The remainder of the starch and the magnesium stearate are added and mixed. This mixture then is compressed into tablets.

Composition I

Tablets used for oral administration of 1-(2,4-dichlorophenyl)-5-aminotetrazole as described hereinafter and having the following composition per tablet are produced by compounding the ingredients in the same relative proportions.

Ingredients: Amount, mg.
1-(2,4-dichlorophenyl)-5-aminotetrazole _____ 200
Lactose _____ 200
Microcrystalline cellulose _____ 30
Polyvinylpyrrolidone _____ 5
Amberlite XE–88 [1] _____ 5
Magnesium stearate _____ 4

[1] Potassium salt of a carboxylic acid cation exchange resin.

The first three ingredients are mixed, granulated with an alcoholic solution of the polyvinylpyrrolidone, dried, and sized. The Amberlite and the magnesium stearate are added. The batch is mixed and compressed into tablets.

EXAMPLE 4

Central nervous system depressant activities were determined for 1-substituted-5-aminotetrazoles, by a mouse battery assay. Mice were tested in groups of five, employing three treated groups and one untreated control group for each test. The average response to each tetrazole was determined at 200 mg./kg. The tetrazoles were administered orally in 1% aqueous pectin, administering 2 ml. per 100 grams of body weight to each animal. Separate assays were run 30, 60 and 120 minutes after drug administration, and the results are reported in Table I which follows, as the average response for all three time periods. The table shows the average fall of body temperature, hind limb extensor tonus block, and increase in Metrazol threshold.

TABLE I

[Central nervous system depressant activities of 1-substituted phenyl-5 aminotetrazoles]

| Phenyl substituent | Body temp. fall, °F. | H.L. extensor tonus block, percent of animals | Metrazol threshold increase, percent |
| --- | --- | --- | --- |
| m-Chloro | 2.2 | 100 | 107 |
| m-Bromo | 2.2 | 100 | 62 |
| m-Fluoro | 4.2 | 100 | 71 |
| o-Chloro | 3.3 | 100 | 24 |
| o-Bromo | 3.4 | 100 | 13 |
| o-Fluoro | 4.3 | 100 | 11 |
| p-Chloro | 5.1 | 80 | 83 |
| p-Bromo | 2.9 | 73 | 35 |
| p-Fluoro | 6.8 | 87 | 49 |
| 2,3-dichloro | 2.2 | 100 | 106 |
| 2,4-dichloro | 5.5 | 100 | 259 |
| 2,6-dichloro | 2.9 | 100 | 30 |
| 3,4-dichloro | 3.4 | 53 | 44 |
| 3,5-dichloro | 1.2 | 100 | 145 |
| m-Methyl | 7.3 | 100 | 55 |
| o-Methyl | 7.4 | 100 | 33 |
| p-Methyl | 7.4 | 60 | 102 |
| 2,6-dimethyl | 9.9 | 100 | 8 |

The compounds all exhibited muscle relaxant activity, indicated by extensor tonus block and body temperature fall. The activities of the compounds did not decrease over the period from ½ hour after administration to 2 hours after administration, indicating that the compounds were long-acting. It is preferred that the elevation of Metrazol threshold be not more than about 100%, more preferably not more than 50%, for use as a muscle relaxant. An increase in the Metrazol threshold of greater than 100% indicates that the compound has sedative-hypnotic properties.

Similar tests conducted with 1-(2,4-dichlorophenyl)-5-aminotetrazole at 100 mg./kg. indicated an activity at 6 hours of about 50% of the half-hour activity and continued activity at 24 hours, based on Metrazol threshold elevation.

A similar battery of tests were conducted with 1-benzyl-5-aminotetrazole and 1-phenethyl-5-aminotetrazole and provided the results shown in Table II–A.

TABLE II-A

Central nervous system depressant activities of 1-(substituted)-5-amino tetrazoles]

| Substituent | Body temp. fall, °F. | H.L. extensor tonus block, percent of animals | Metrazol threshold increase, percent |
| --- | --- | --- | --- |
| Phenethyl | 8.3 | 40 | 108 |
| Benzyl | 7.6 | 100 | 7 |

In toxicity studies with 1-(2,4-dichlorophenyl)-5-aminotetrazole, administration at relatively high doses to rats for one month produced no toxic manifestations, and a low order or toxicity was found in standard toxicity studies on rabbits and dogs. Tests for determining the acute oral toxicity in mice resulted in 0/5 dead at 400 mg./kg., 0/10 dead at 800 mg./kg., and 4/10 dead at 1600 mg./kg. In tests for determining the acute oral toxicity in rats, the m-chlorophenyl and the 3,4-dichlorophenyl compounds administered at 800 mg./kg. resulted in 0/5 dead, and the m-bromophenyl, m-fluorophenyl, o-bromophenyl, p-bromophenyl, p-fluorophenyl, 2,3-dichlorophenyl, 2,6-dichlorophenyl, and 3,5-dichlorophenyl compounds results in 0/5 dead at 200 mg./kg. The results demonstrated relatively low toxicity for the 1-halophenyl-5-aminotetrazoles.

From the foregoing, it becomes apparent that the invention herein described and illustrated fulfills all of our objectives, expressed and implied, in a remarkably unexpected fashion and that we have developed new and useful compounds, pharmaceutical compositions and therapeutic methods for providing muscle relaxation in hosts receiving such therapy.

What is claimed is:

1. A method of providing muscle relaxation in a host suffering from abnormal muscle tone and tension comprising administering to said host, a compound selected from the group consisting of a 1-(substituted)-5-aminotetrazole and a pharmaceutically acceptable salt thereof in an amount sufficient to produce muscle relazation in said host, said (substituted) moiety being selected from the group consisting of substituted phenyl, benzyl, substituted benzyl and phenethyl, said substituted phenyl being mono- or dihalophenyl, mono- or dihydroxyphenyl, mono- or dialkylphenyl or mono- or dialkoxyphenyl, and said substituted benzyl being mono- or dihalobenzyl or mono- or dialkylbenzyl.

2. A method according to claim 1 in which said substituted phenyl is a halophenyl selected from the group consisting of monochlorophenyl, monobromophenyl, monofluorophenyl and dichlorophenyl.

3. A method according to claim 1 in which said substituted phenyl is ortho-monomethylphenyl or 2,6-dimethylphenyl.

4. A method according to claim 2 in which said halophenyl is ortho-monohalophenyl or 2,6-dichlorophenyl.

5. A method according to claim 1 in which said substituted phenyl is ortho substituted.

6. A method according to claim 5 in which phenyl is disubstittued, at least one moiety of which is at the ortho position.

7. A method according to claim 1 in which said amount is from about 50 milligrams to about 8000 milligrams per day.

8. A method according to claim 7 in which said amount is from about 300 to 4000 milligrams per day.

References Cited

UNITED STATES PATENTS 3,278,381  10/1966  Bossinger et al. _____ 424—269

STANLEY J. FRIEDMAN, Primary Examiner

U.S. Cl. X.R.

260—308.4

UNITED STATES PATENT OFFICE
CERTIFICATE OF CORRECTION

Patent No. 3,557,285    Dated January 19, 1971

Inventor(s) Takashi Enkoji and Charles D. Bossinger

It is certified that error appears in the above-identified patent and that said Letters Patent are hereby corrected as shown below:

Col. 2, line 21-25 (Formula)

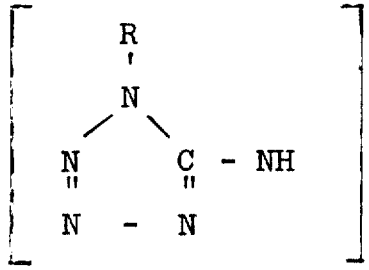

should read

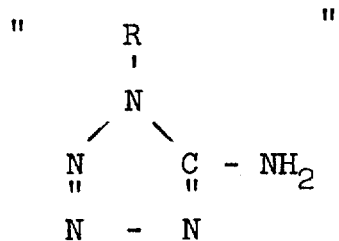

Col. 4, line 54 /In a nice bath/ should read: "in an ice ba

Signed and sealed this 15th day of June 1971.

(SEAL)
Attest:

EDWARD M. FLETCHER, JR.                    WILLIAM E. SCHUYLER

Attesting Officer                           Commissioner of Pat